UNITED STATES PATENT OFFICE.

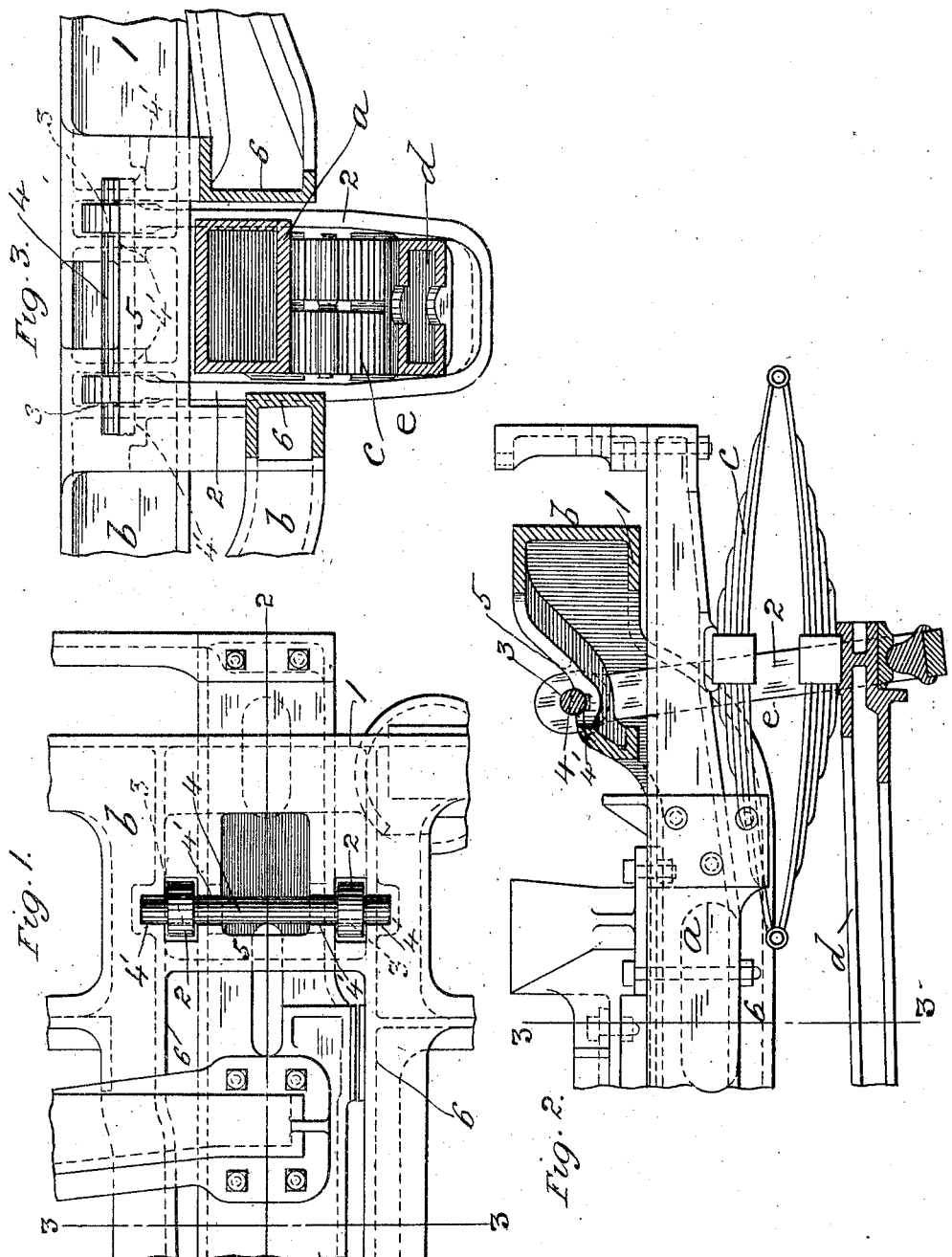

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

CAR-TRUCK.

1,016,629.  Specification of Letters Patent.  Patented Feb. 6, 1912.

Application filed May 5, 1911. Serial No. 625,394.

*To all whom it may concern:*

Be it known that we, CLARENCE H. HOWARD and HARRY M. PFLAGER, citizens of the United States, residing at St. Louis, Missouri, have invented certain new and useful Improvements in Car-Trucks, of which the following is a full, clear, and exact description, such as will enable others skilled in the art to which it appertains to make and use the same, reference being had to the accompanying drawings, forming part of this application, in which—

Figure 1 is a top plan view of an end and adjacent portion of one of the cross bolsters and corresponding part of the frame of a six-wheeled car truck, having our improved swing-hanger applied thereto; Fig. 2 is a side elevation of the bolster and corresponding section through the frame and swing-hanger on line 2—2, Fig. 1, and Fig. 3 is a cross section through the bolster and corresponding section through the frame on line 3—3, Figs. 1 and 2, showing the swing-hanger in front elevation.

This invention relates to new and useful improvements in car trucks, and particularly to six-wheeled trucks, the object being to construct the truck in such manner that the pin or bolt from which the stirrup is suspended may be removed conveniently to dismantle the truck for purposes of repair, etc. Ordinarily, the upper ends of the stirrup terminate opposite the bolster, the ends of which pass under the side members of the truck frame, and hence it is a matter of considerable difficulty to remove the pins by which the stirrups are connected to the lugs on the under side of the truck frame for the purpose of dismantling the truck.

Our invention consists in extending the stirrups up through the truck frame so as to locate the bolt or pin above the horizontal plane of the bolster whereby to dismantle the truck the spring may be compressed to enable the stirrup to be lifted and the pin removed.

Other features of the invention consist in the construction, arrangement and combination of the several parts, all of which will hereinafter be more specifically described and pointed out in the claims.

*a* represents an end and adjacent portion of one of the cross bolsters and *b* the corresponding part of the frame of a six-wheeled car truck, the end portion of the bolster *a* passing beneath the side member or wheelpiece 1 of the frame *b* and bearing thereat on the springs *c* which are supported on the spring-plank *d*, all said parts being duplicated at the other side of the truck and except as to the adaptation of the frame *b* to our invention, being of the usual well-known construction in this type of truck and needing no further description.

*e* is the swing-hanger or stirrup which, in the present case, is of the swing-link type adapted to pass under and support the corresponding portion of the spring-plank *d* in the usual manner, the opposite arms 2 of the hanger *e* being extended upward above the bolster *a* and formed transversely therethrough at their upper ends, respectively, with an eye 3. Through and projecting beyond the opposite eyes 3 is passed a circular rod or pin 4 which in the assembled position of the parts is pivotally mounted in horizontal alined and preferably semi-circular bearings 4′, preferably one on each side of each arm 2 and formed in the top of a suitably shaped bridge member or web 5 which connects the opposite cross members or transoms 6 together at a suitable distance above the top of the bolster *a*, sufficient play for the free swing of the hanger *e* being allowed at the pivoted end of each arm 2 between its bearings 3 as shown.

By the above construction, on prying and slightly raising the spring-plank *d* with the springs *c* and bolster *a*, their weight is removed from the upper pivot 4, thereby enabling the latter to be released from its bearings 4′ and withdrawn from the arms 2 of the hanger *e* which is then readily lowered and removed from the truck and replaced or renewed without disturbing the bolster *a* and its appendages.

It will be observed that the member 5 bridging the transoms 6 near their ends, considerably strengthens the truck frame, and by providing connecting webs between this member and the side member of the truck frame, we are enabled to provide bearings on each side of the legs of the stirrup whereby the supporting bolt or rod 4 finds bearing closely adjacent to each side of said stirrup legs. By thus projecting the ends of the stirrup legs up through openings in the truck frame and providing bearings on each side of said openings for the bolt or rod 4, said bolt is placed under a double shearing strain which makes the structure extremely strong. The outside bearings are preferably blind so as to prevent endwise motion of the rod 4.

As the bolt or rod 4 is made of drawn metal and the eyes through the stirrup legs are drilled, it will be observed that the tendency of the stirrup is to swing on the rod 4 on account of the small frictional resistance as compared to the added resistance in the bearings of the rod 4 resulting from the unmachined casting of which the truck frame is made. We prefer to have the bearings for the rod 4 of the truck frame a close, snug fit, so that the rough surface of the unmachined casting will grip the rod tightly and prevent its rotation. If, however, it is desired, the rod 4 can be enlarged laterally and the seat or bearing for the rod provided with a recess to receive this enlargement, as shown by dotted lines in Fig. 2, whereby the rod will be prevented from turning in its bearing.

We claim:

1. In a car truck, the combination of a cast frame comprising side members and transom members, said transom members having a horizontally disposed connecting web adjacent said side frame member, a bolster, a supporting stirrup for said bolster extending up through openings in said horizontal web, and a removable pivot pin seated in recesses in the upper surface of said web, said pin passing through the upper end of said stirrup.

2. The combination of a cast truck frame comprising an end member and transom members, of a horizontally disposed web between said transom members adjacent the said side member, said web being reinforced by vertical strengthening ribs and having openings between said ribs and said transom members, a stirrup extending through said openings, and a pivot pin arranged above said web and passing through eyes in the upper ends of said supporting members.

3. The combination of a cast truck frame comprising a side member and transom members, said transom members being reinforced by a horizontally disposed web adjacent the side member, and said web being reinforced by vertically disposed ribs arranged substantially parallel to said transom members, openings in said web and recesses on each side of said openings, a stirrup, and a pivot pin passing through eyes in said stirrup and seated in said recesses.

4. The combination of a cast truck frame comprising a side member and transom members, a horizontally disposed web provided with openings therein, said web having recesses on each side of said opening, a stirrup passing through said openings, and a pivot pin passing through eyes in the upper ends of said stirrup and seated in said recesses, said pivot pin being prevented, by the ends of said recesses, from moving longitudinally.

5. The combination of a cast truck frame comprising a side member and transom members, a horizontally disposed web provided with openings therein, said web having recesses on each side of said opening, a stirrup passing through said openings, a pivot pin passing through eyes in the upper ends of said stirrup and seated in said recesses, said pivot pin being prevented, by the ends of said recesses, from moving longitudinally, and means for preventing the rotation of said pivot pin in said recesses.

6. In a car truck, the combination of a truck frame and its transoms, of a member forming a connection between said transoms adjacent the side member, said connecting member having upwardly opening pin seats.

7. In a car truck, the combination of a truck frame and its transoms, of a bridge member forming a connection between said transoms adjacent the side member, said bridge member having upwardly opening pin seats, the ends of which are closed.

8. In a car truck, the combination of a side member, transom members, a bridge member, the said bridge member connecting the transom members adjacent the side member and having vertically disposed webs on its underside, substantially parallel to the transom members, and openings through said bridge member between said strengthening webs and transom members, said openings being flanked on each side by pin seats.

In testimony whereof, we hereunto affix our signatures in the presence of two witnesses, this 25th day of April, 1911.

CLARENCE H. HOWARD.
HARRY M. PFLAGER.

Witnesses:
C. T. WESTLAKE,
HAL C. BELLVILLE.